US011489450B2

(12) United States Patent
Xu et al.

(10) Patent No.: US 11,489,450 B2
(45) Date of Patent: Nov. 1, 2022

(54) DEVICES, SYSTEMS, AND METHODS FOR POWER SUPPLIES

(71) Applicant: Flex Ltd., Singapore (SG)

(72) Inventors: HuaMin Xu, Shenzhen (CN); Weian Chen, Shenzhen (CN); Xiao Dong Liu, Shenzhen (CN)

(73) Assignee: Flex Ltd., Singapore (SG)

( * ) Notice: Subject to any disclaimer, the term of this patent is extended or adjusted under 35 U.S.C. 154(b) by 4 days.

(21) Appl. No.: 17/238,948

(22) Filed: Apr. 23, 2021

(65) Prior Publication Data

US 2022/0224238 A1 Jul. 14, 2022

(30) Foreign Application Priority Data

Dec. 23, 2020 (CN) .......................... 202011543033.2

(51) Int. Cl.
*H02M 3/335* (2006.01)
*H02M 1/00* (2006.01)
(52) U.S. Cl.
CPC ..... *H02M 3/33592* (2013.01); *H02M 1/0009* (2021.05)

(58) Field of Classification Search
CPC .................. H02M 3/33592; H02M 1/0009
See application file for complete search history.

(56) References Cited

U.S. PATENT DOCUMENTS

2017/0353167 A1* 12/2017 Eum .................... H05B 45/395

* cited by examiner

*Primary Examiner* — Adolf D Berhane
*Assistant Examiner* — Afework S Demisse
(74) *Attorney, Agent, or Firm* — Sheridan Ross P.C.

(57) ABSTRACT

At least one example embodiment is directed to a method for controlling a rectifier. The method includes applying a first control signal to a first switch of the rectifier to cause a first current to flow through a first inductor of the rectifier, applying a second control signal to a second switch of the rectifier to cause a second current to flow through a second inductor. The second control signal and the first control signal have a phase difference. The method includes detecting that the first current falls to a first minimum value at a first time, detecting that the second current falls to a second minimum value at a second time, determining a first difference between the first time and the second time, and determining whether to adjust the second control signal based on the first difference to bring the phase difference closer to a target phase difference.

20 Claims, 7 Drawing Sheets

DEVICES, SYSTEMS, AND METHODS FOR POWER SUPPLIES

CROSS REFERENCE TO RELATED APPLICATIONS

This application claims priority under 35 U.S.C. § 119 to Chinese Application No. 202011543033.2 filed on Dec. 23, 2020, the entire disclosure of which is hereby incorporated by reference, in its entirety, for all that it teaches and for all purposes.

FIELD

The present disclosure is generally directed to devices, systems, and methods for power supplies, in particular, power supplies that convert alternating current (AC) signals to direct current (DC) signals.

BACKGROUND

Many modern devices utilize power supplies that convert an AC input signal into a DC output signal for supplying power to the device or other load. A power supply may include a rectifier circuit that performs the conversion using diode bridges and/or actively controlled switches. Characteristics that drive the design of a rectifier circuit include conversion efficiency, reliability, generated interference (e.g., electromagnetic interference (EMI)), and the like.

SUMMARY

Figure 1:
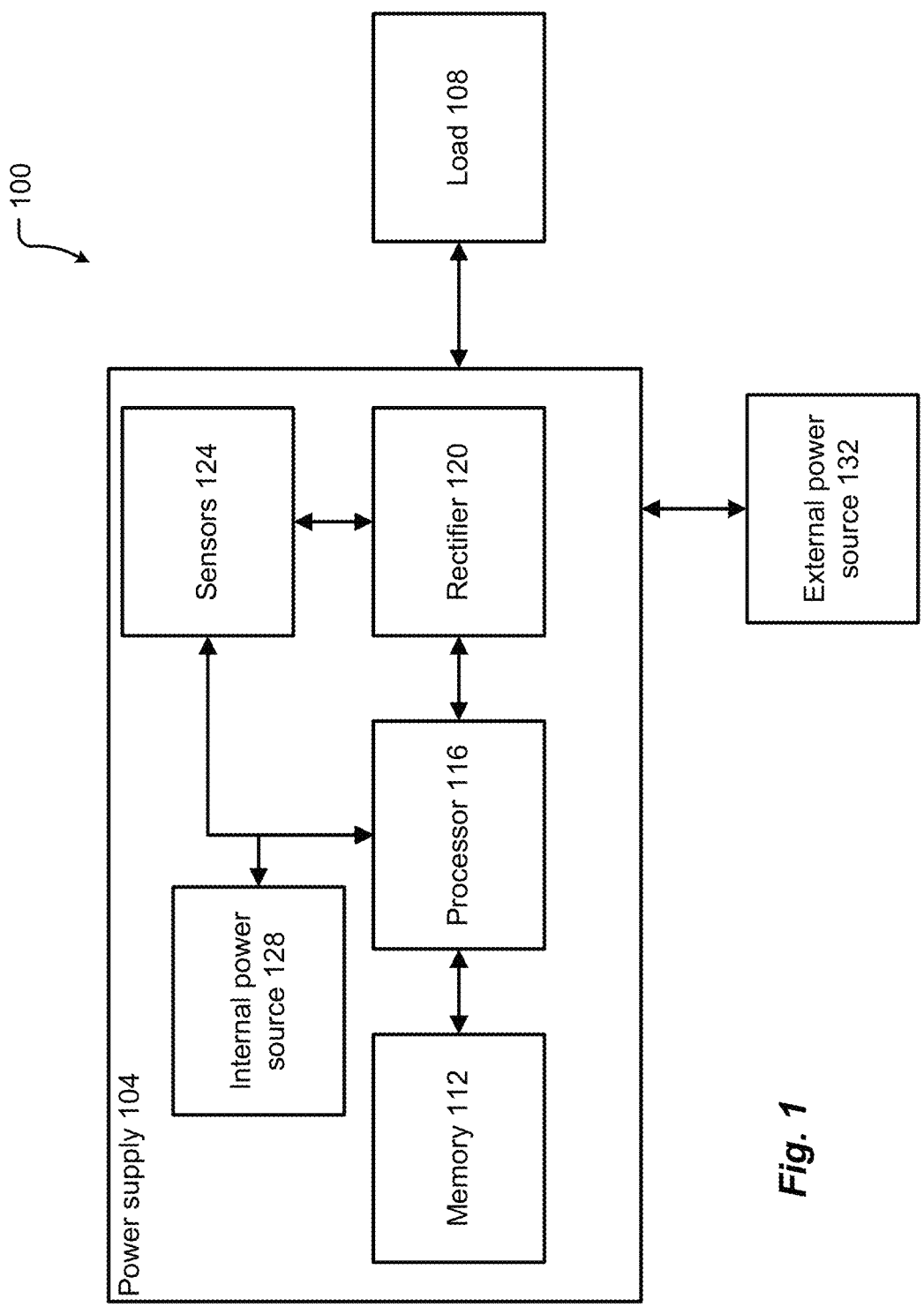
FIG. 1 illustrates a block diagram of a system according to at least one example embodiment.

At least one example embodiment is directed to a method for controlling a rectifier. The method includes applying a first control signal to a first switch of the rectifier to cause a first current to flow through a first inductor of the rectifier, applying a second control signal to a second switch of the rectifier to cause a second current to flow through a second inductor. The second control signal and the first control signal have a phase difference. The method includes detecting that the first current falls to a first minimum value at a first time, detecting that the second current falls to a second minimum value at a second time, determining a first difference between the first time and the second time, and determining whether to adjust the second control signal based on the first difference to bring the phase difference closer to a target phase difference.

At least one example embodiment is directed to a device for controlling a rectifier, the device comprising a memory including instructions and a processor. The processor executes the instructions to apply a first control signal to a first switch of the rectifier to cause a first current to flow through a first inductor of the rectifier, apply a second control signal to a second switch of the rectifier to cause a second current to flow through a second inductor of the rectifier. The second control signal and the first control signal have a phase difference. The processor executes the instructions to detect that the first current falls to a first minimum value at a first time, detect that the second current falls to a second minimum value at a second time, determine a first difference between the first time and the second time, and determine whether to adjust the second control signal based on the first difference to bring the phase difference closer to a target phase difference.

At least one example embodiment is directed to a system comprising a plurality of switches configured in a rectifier topology and including a first switch and a second switch and a controller. The controller is configured to apply a first control signal to the first switch of the rectifier to cause a first current to flow through a first inductor of the rectifier, apply a second control signal to the second switch of the rectifier to cause a second current to flow through a second inductor of the rectifier, the second control signal and the first control signal having a phase difference, detect that the first current falls to a first minimum value at a first time, detect that the second current falls to a second minimum value at a second time, determine a first difference between the first time and the second time, and determine whether to adjust the second control signal based on the first difference to bring the phase difference closer to a target phase difference.

DETAILED DESCRIPTION

In general, rectifiers employing silicon metal oxide semiconductor field effect transistors (Si-MOSFETs) as rectifying switches should not enter continuous conduction mode (CCM) because the MOSFETs may short circuit as a result the body diode reverse recovery current. Related art methods for interleave control include applying a master signal to one switch in the rectifier while delaying the slave signal applied to another switch in the rectifier, for example, by 180 degrees from the master signal. However, due to characteristics and/or errors inherent to the components of the rectifier (e.g., unavoidable variations in inductance values, temperature variations, and/or the like), related art interleave control methods cannot ensure that the rectifier avoids CCM for most or all conditions.

Accordingly, inventive concepts relate to interleave control for rectifiers, for example, Totem-Pole bridgeless rectifiers operating in a critical conduction mode (CRM) with power factor correction (PFC). Rectifiers according to inventive concepts may be implemented with Si-MOSFET switches intended for AC-DC converters. Inventive concepts provide the ability to achieve a desired interleave between master and slave signals while ensuring that the rectifier does not enter CCM.

General operation of a rectifier according to inventive concepts will now be described. Initially, the pulse width modulator (PWM) or other signal generator of the system sets an initial phase difference between a master PWM signal (or first control signal) and a slave PWM signal (or second control signal). In both positive and negative half cycles of an AC input signal, detection of zero current on a master inductor (or first inductor) controls the on/off periods of the master PWM signal, and detection of zero current on a slave inductor (or second inductor) controls the on/off periods of the slave PWM signal (or second control signal). In at least one example embodiment, zero current detection through slave inductor is also used as a trigger signal for capturing the master PWM counter (or capturing an auxiliary PWM counter in the processor (e.g., digital signal processor (DSP)) which is a copy of the master PWM signal.

Based on the captured value, the system modifies the slave PWM signal to change the period of a pulse of the slave PWM signal. For example, when the captured value is more than half of a period of a pulse of the master PWM signal, then the system decreases the period of the slave PWM signal. When the captured value is less than half of the period of the master PWM signal, then the system increases the period of the slave PWM signal. The amount of period adjustment for the slave PWM signal is based on the error between captured value and half of the period of the master PWM signal. When the error between captured value and half of the period of the master PWM signal is in a target range, the phase difference between master PWM signal and the slave PWM signal is considered to be 180 degrees.

Compared to related art interleave control for Totem-Pole bridgeless CRM PFC devices, example embodiments ensure that power factor correction works in CRM with acceptable interleave for the master and slave signals. To further summarize, example embodiments provide PWM on/off control of master and slave signals based on respective zero current signals flowing through respective inductors. Example embodiments estimate interleave between the two signals by determining an error (e.g., a time difference) between the captured value of the master PWM counter and a half value of a period of the master PWM signal. In addition, example embodiments use a zero-current detection of the slave inductor as a trigger signal to capture the master PWM counter (or to capture the auxiliary PWM counter which is a copy of the master PWM counter). Thereafter, a desired interleave between the master and slave PWM signals is achieved by increasing or reducing the period of the slave PWM signal. Accordingly, example embodiments provide active interleave control.

FIG. 1 illustrates a system 100 according to at least one example embodiment. The system 100 includes a power supply 104, a load 108, and an external power source 132. The load 108 may include any device powered and/or charged by a DC signal from the power supply 104. Examples of the load 108 include a personal computer, components within a personal computer, a server, components within a server, a smartphone, components within a smartphone, a tablet, components within a tablet, manufacturing equipment, and/or the like.

The source 132 may be a power source that generates AC power signals. One example of the source 132 is a traditional North American power outlet that produces 120V at 60 Hz. However, example embodiments are not limited thereto, and the source 132 may include any AC signal generator that generates signals at any desired voltage and frequency.

The power supply 104 may include memory 112, a controller or processor 116, a rectifier 120, sensors 124, and an internal power source 128. The memory 112 may be a computer readable medium including instructions that are executable by the processor. The memory 112 may include any type of computer memory device and may be volatile or non-volatile in nature. In some embodiments, the memory 112 may include a plurality of different memory devices. Non-limiting examples of memory 112 include Random Access Memory (RAM), Read Only Memory (ROM), flash memory, Electronically-Erasable Programmable ROM (EEPROM), Dynamic RAM (DRAM), etc. The memory 112 may include instructions that enable the processor to control various functions and to store data. The memory 112 may be local (e.g., integrated with) the processor 116 and/or separate from the processor 116.

The controller or processor 116 may correspond to one or many computer processing devices. For instance, the processor 116 may be provided as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 116 may be provided as a digital signal processor (DSP), Central Processing Unit (CPU), or plurality of microprocessors that are configured to execute the instructions sets stored in memory. The processor 116 may enable various functions of the power supply 104.

The rectifier 120 may convert an AC signal from the source 132 into a DC signal for powering the load 108. As discussed in more detail below, the rectifier 120 may be have a totem-pole bridgeless PFC design that employs MOSFETs. The power supply 104 may be a smart power supply that includes the ability to be controlled remotely using wireless signals (e.g., Wi-Fi).

The sensors 124 include any suitable devices for sensing characteristics of the rectifier 120. In at least one example embodiment, the sensors 124 include one or more current sensors for sensing inductor currents I1 and I2 discussed in more detail below with reference to FIG. 3. Examples of current sensors include a current transformer, magnetic current sensor modules, Hall effect sensors, and/or the like. The sensors 124 may include additional devices for sensing other characteristics, such as temperature, humidity, and/or the like.

The internal power source 128 may provide power for the processor 116 or other element of the power supply 104 that uses power. The internal power source 128 may derive power used for the power supply 104 from the external power source 132.

Although the source 132, the power supply 104, and the load 108 are illustrated as separate elements of the system 100, one or more of these elements may be integrated with one another according to design preferences. For example, the power supply 104 may be integrated with the load 108. In another example, the power supply 104 may be integrated with the source 132.

It should be further appreciated that one or more of the power supply 104, the load 108, and the source 132 in the system 100 may include one or more communication interfaces that enable communication with each other. These communication interfaces include wired and/or wireless communication interfaces for exchanging data and control signals between one another. Examples of wired communication interfaces/connections include Ethernet connections, HDMI connections, connections that adhere to PCI/PCIe standards and SATA standards, and/or the like. Examples of wireless interfaces/connections include Wi-Fi connections, LTE connections, Bluetooth connections, NFC connections, and/or the like.

Inventive concepts related to the structure of the rectifier 120 are described below with reference to FIG. 2. Although the discussion of FIG. 2 may not include specific descriptions for the functionality of every circuit element (e.g., transistors, resistors, capacitors, diodes, etc.) depicted therein, one of ordinary skill in the art may readily deduce the functions of each of the depicted circuit elements based on connections to other circuit elements. In addition, the discussion of FIG. 2 may omit specific descriptions for connections between circuit elements (e.g., an anode of a diode connected to a gate of transistor), but such connections should also be readily recognizable to one of ordinary skill in the art using the illustrated symbols for each circuit element.

Figure 2:
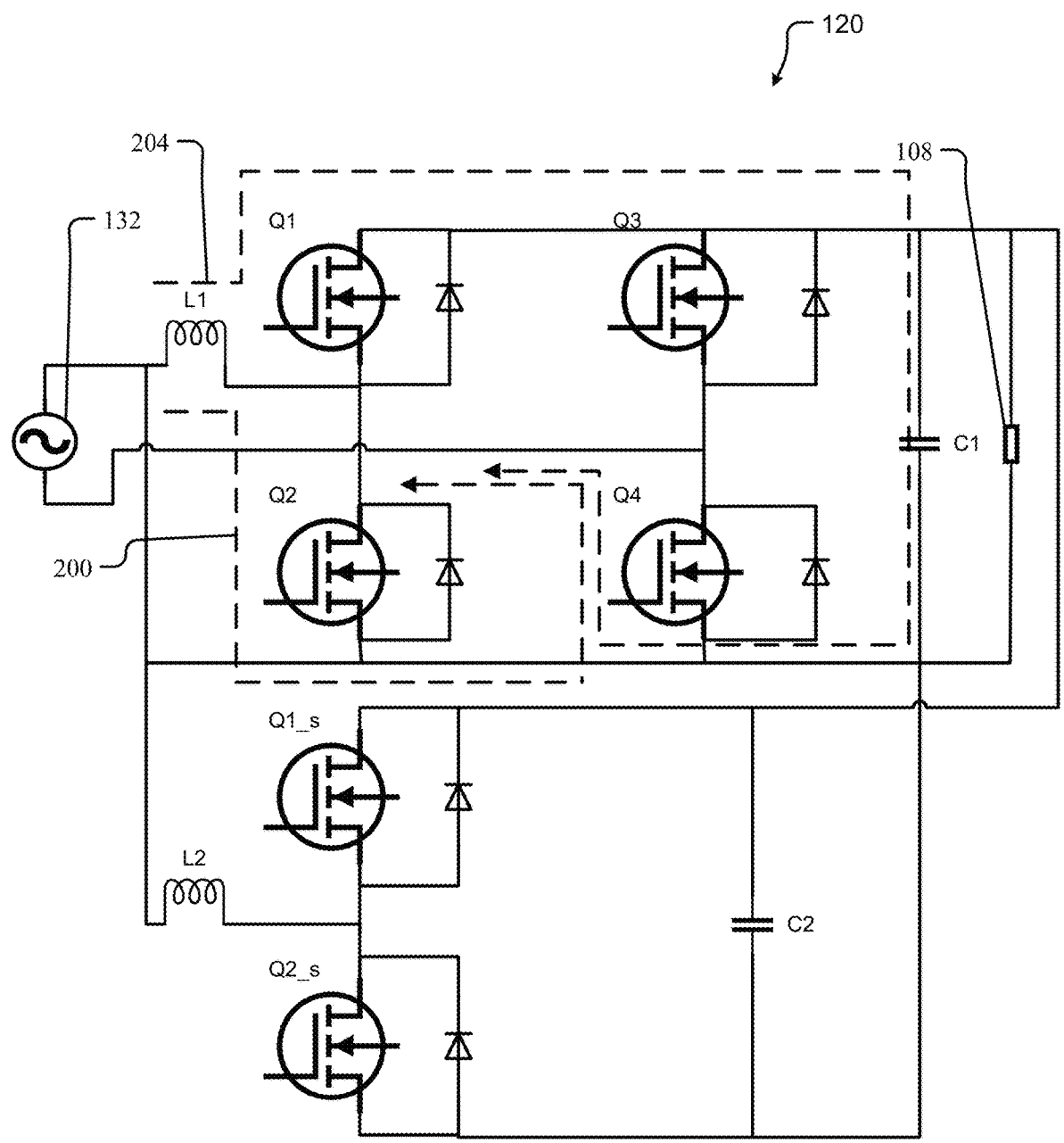
FIG. 2 illustrates a schematic with example circuitry for the rectifier in FIG. 1 according to at least one example embodiment.

FIG. 2 illustrates a schematic with example circuitry for the rectifier 120 in FIG. 1 according to at least one example embodiment. As shown in FIG. 2, the rectifier 120 includes switches Q1, Q2, Q3, Q4, Q1_s, and Q2_s. The switches Q1 to Q2_s are may be implemented with MOSFETs. However, example embodiments are not limited thereto and any suitable transistor or other switching device may be used. As discussed in more detail below, gates of switches Q1 to Q2_s receive control signals that cause the switches to rectify an unrectified signal (AC signal) input to the rectifier 120 and output a rectified signal (DC signal) to the load 108.

The rectifier 120 further includes a first inductor (or master inductor) L1, a second inductor (or slave inductor) L2, and capacitances C1 and C2. Throughout the instant description, switches Q1, Q2, Q3, and Q4, inductor L1, and capacitance C1 may be collectively referred to as a master circuit while switches Q1_s and Q2_s, inductor L2, and capacitance C2 may be collectively referred to as a slave circuit. Here, it should be appreciated that inductance values for inductors L1 and L2 and capacitance values for capacitances C1 and C2 are design parameters set based on empirical evidence and/or preference.

Figure 3:
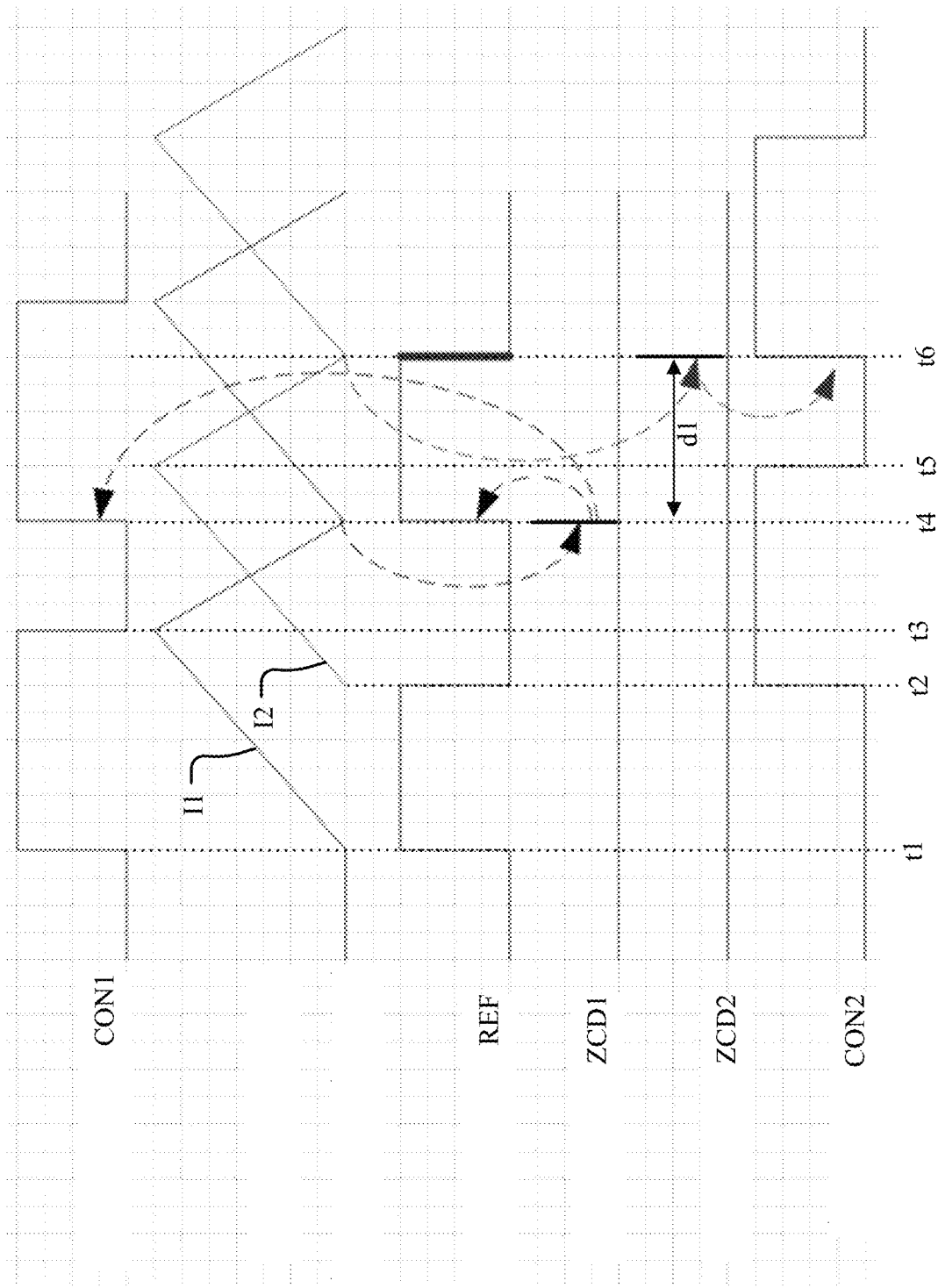
FIG. 3 illustrates a timing diagram for the rectifier from FIG. 2 according to at least one example embodiment.

FIG. 3 illustrates a timing diagram for the rectifier 120 from FIG. 2. Operation of the rectifier 120 will now be described with reference to FIGS. 1-3. FIG. 3 illustrates control signals CON1 and CON2, zero current detection signals ZCD1 and ZCD2, and a reference signal REF. Here, it should be appreciated that the reference signal REF is an optional internal clock signal of the processor 116, and includes rising edges timed to match the rising edges of the control signal CON1. The reference signal REF may be used in applications where the control signal CON1 is not available to be tracked by the processor 116.

The on/off states of the switches Q1 to Q2_s are controlled differently for the positive and negative halves of an AC wave. FIGS. 2 and 3 illustrates an example for the positive half of an AC wave for the rectifier 120. As shown in FIG. 3, at time t1 of the positive half of the AC wave, Q3 is off, Q4 is on, and a first control signal (or master PWM signal) turns on Q2 to cause a first inductor current I1 sensed at inductor L1 to increase and flow along current path 200, thereby "charging" the inductor L1.

At time t2 of the positive half of the AC wave and with Q3 still off and Q4 still on, a second control signal CON2 turns on switch Q2_s to cause a second inductor current I2 sensed at the inductor L2 to increase and flow along an unillustrated current path that passes through Q2 and Q4.

At time t3, the inductor current I1 reaches a maximum and the first control signal CON1 turns off Q2. Although not explicitly shown, shortly after or at time t3, another control signal turns on Q1 which "discharges" the inductor current I1 to the capacitance C1 by flowing along current path 204.

At time t4, the system (e.g., the processor 116 with the aid of current sensors 124) detects that the inductor current I1 for inductor L1 reaches a minimum value (e.g., zero amps or some other minimum value). The zero-current detection ZCD1 of inductor current I1 reaching a minimum serves as a trigger to capture, record, or otherwise keep track of the time at which the detection occurs. For example, the processor 116 may record a time stamp when the inductor current I1 reaches the minimum, start a timer, and/or the like. Also at time t4, the control signal CON1 again turns on Q2 to begin the "charging" process of inductor L1 where inductor current I1 is gradually increased in the same manner as described above with respect to time t1. Although not explicitly shown, shortly before or at time t4, another control signal turns off Q1 to complete the "discharge" process for inductor L1.

At time t5, the inductor current I2 for inductor L2 reaches a maximum, and the control signal CON2 turns off Q2_s. Although not explicitly shown, shortly after or at time t5, another control signal turns on Q1_s to discharge the inductor current I2 to the capacitance C2 along a current path through Q1_s and Q4.

At time t6, the processor 116 detects that the inductor current I2 reaches a minimum value (e.g., zero amps or some other minimum value). The zero-current detection ZCD2 of inductor current I2 reaching a minimum serves as a trigger to capture, record, or otherwise keep track of the time at which the detection occurs. For example, the processor 116 may record a time stamp when the inductor current I2 reaches the minimum, stop the timer that was started at time t4, and/or the like.

As described in more detail below, the processor 116 may determine a first difference d1 between times t4 and t6, and use the first difference d1 to determine whether to adjust a period or pulse width of the control signal CON2 in order to bring the control signals CON1 and CON2 closer to a target phase difference. The target phase difference may be equal to 180 degrees, which may be defined as the rising edge of control signal CON2 occurring at or near the midpoint of the period of control signal CON1.

FIGS. 2 and 3 have been described with respect to a positive half of an AC wave. However, one skilled in the art can appreciate how the rectifier 120 operates for the negative half of the AC wave. For example, during the negative half of the AC wave, roles of the switches are reversed so that Q3 is on, Q4 is off, control signal CON1 drives Q1, and control signal CON2 drives Q1_s. The control signals applied to Q1 and Q1_s to discharge energy for the positive half of the AC wave are now applied to Q2 and Q2_s to discharge energy for the negative half of the AC wave. The same zero-current detection concepts apply to the negative half of the AC wave in order to determine whether to adjust control signal CON2 during the negative half of the AC wave.

Figure 4:
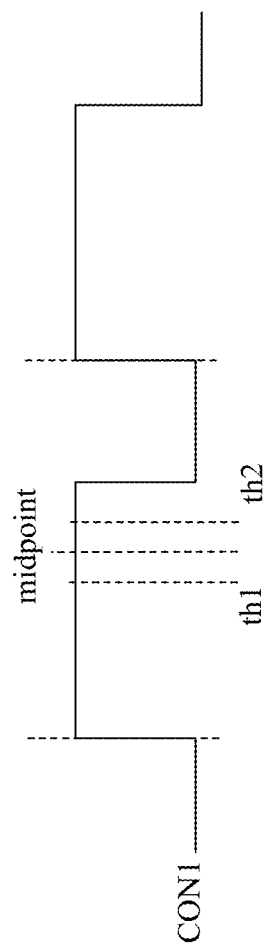
FIG. 4 illustrates an example waveform for explaining how to determine whether to adjust a control signal according to at least one example embodiment.

FIG. 4 illustrates an example waveform for explaining how to determine whether to adjust the control signal CON2 from FIG. 3. In at least one example embodiment, determining whether to adjust the second control signal CON2 includes comparing the first difference d1 to a first threshold value th1 and a second threshold value th2 greater than the first threshold value th1. In the example of FIGS. 3 and 4, the first difference d1 may correspond to a time difference between time t6 and time t4 in FIG. 3, while the first and second threshold values th1 and th2 may correspond to times on either side of a midpoint of a period of the control signal CON1 (e.g., 0.5 (t4-t1) in FIG. 3). For example, threshold th1 may correspond to a length of time from a rising edge of the control signal CON1 to some point in time that is before than the midpoint of the period of the control signal CON1. Similarly, threshold th2 may correspond to a length of time from the rising edge of the control signal CON1 to a point in time that is after the midpoint of the period of the control signal CON1. Thus, it may be said that the second threshold th2 is greater than the first threshold th1 (i.e., threshold th2 is later in time from the rising edge of the control signal CON1 than the threshold th1). The thresholds th1 and th2 may be equidistant in time away from the midpoint of the period of the control signal CON1 or different amounts of time away from the midpoint of the period of the control signal CON1 depending on design preferences. The amounts of time away from the midpoint of the period may also be a design parameter set based on empirical evidence and/or preference.

In general, the pulse duration of the control signal CON2 is adjusted when the first difference d1 is outside of the range between th1 and th2, and not adjusted when the first difference d1 is within the range between th1 and th2. For example, a duration of a pulse of the control signal CON2 is adjusted to be longer when the first difference d1 is greater than the second threshold value th2, and the duration of the pulse the control signal CON2 is adjusted to be shorter when the first difference d1 is less than the first threshold value th1. In either case, the amount of adjustment for a pulse of the control signal CON2 may be based on a second difference that corresponds to a difference (e.g., a time difference) between the first difference d1 and the first threshold value th1 or the second threshold value th2. For example, the second difference is a time difference between the first difference d1 and the threshold th1 when the first difference d1 is less than the threshold th1, while the second difference is a time difference between the first difference d1 and the threshold th2 when the first difference d1 is greater than the threshold th2. In at least one example embodiment, the amount of the adjustment for the duration of the pulse of the control signal CON2 is proportional to the second difference. For example, if the second difference d2 corresponds to "x" amount of time, then the pulse width of the control signal CON2 may be adjusted to be longer or shorter by x, some fraction of x (e.g., x/2), or a multiple of x (e.g., 2×). However, example embodiments are not limited to this method of adjusted, and other methods may be employed. For example, adjustments may be made in a step-wise fashion, where different ranges of values for the second difference have different predetermined amounts of adjustment for the control signal CON2. In addition, it should be appreciated that the duration of a pulse in control signal CON2 may be adjusted by controlling the rising edge of the pulse to be earlier or later in time and/or by controlling the falling edge of the pulse to be earlier or later in time.

Figure 5:
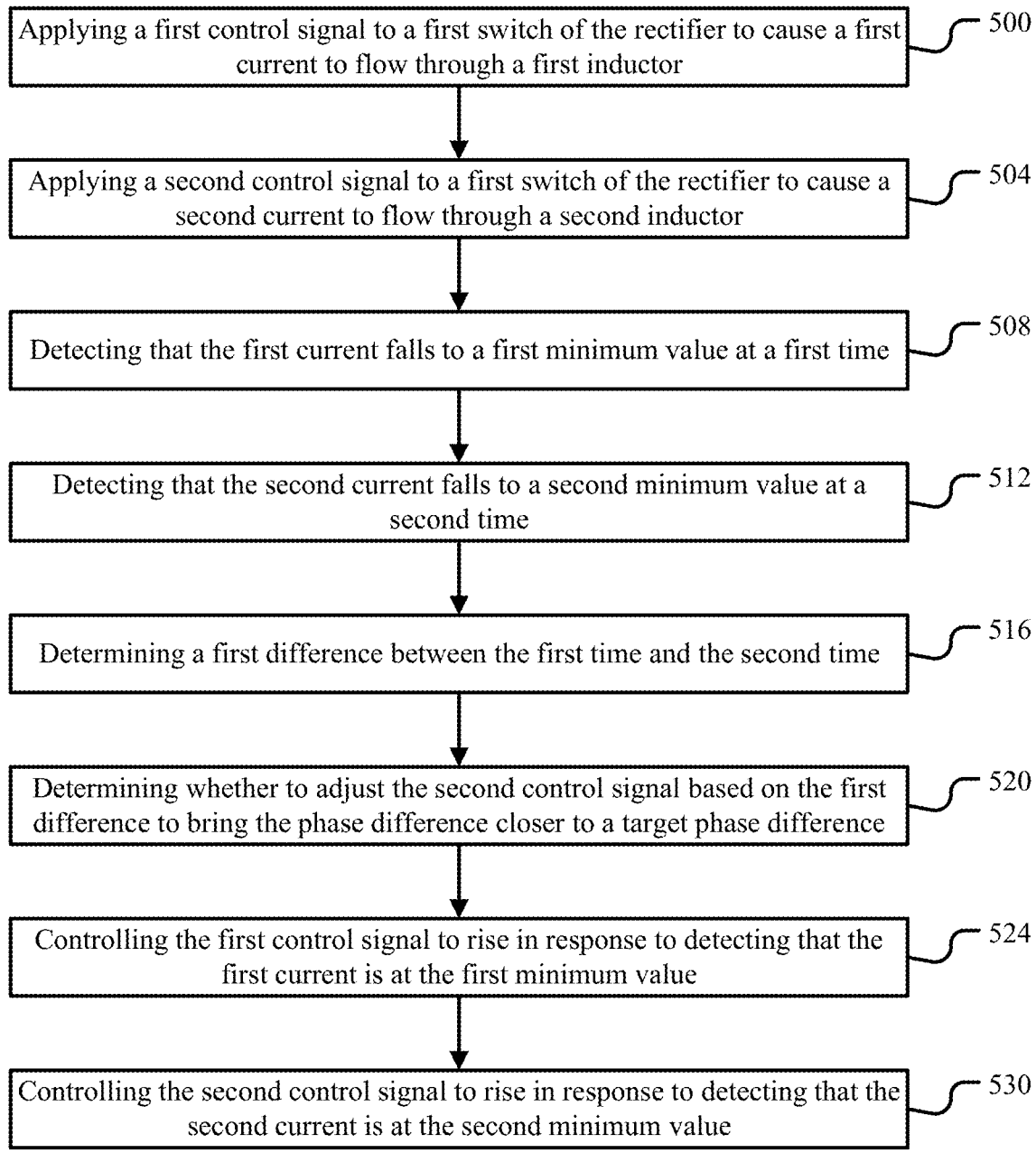
FIG. 5 illustrates a method according to at least one example embodiment.

FIG. 5 illustrates a method according to at least one example embodiment. The method in FIG. 5 may be carried out by elements of the system 100, for example, by the processor 116. FIG. 5 will be discussed in more detail below with reference to FIGS. 1-4. The order of the operations in FIG. 5 is not limited the order illustrated, and may change according to design preferences.

Operation 500 includes applying a first control signal CON1 to a first switch Q2 of the rectifier to cause a first current I1 to flow through a first inductor L1 of the rectifier 12. For example, the first control signal CON1 is applied to a gate of the first switch Q2.

Operation 504 includes applying a second control signal CON2 to a second switch Q2_s of the rectifier to cause a second current I2 to flow through a second inductor L2. Here, the second control signal CON2 and the first control signal CON1 have a phase difference, for example, an initial preset phase difference of 180 degrees. The 180 degree phase difference may also serve as a target phase difference to maintain between the control signals CON1 and CON2. However, during operation of the rectifier 120, the initial phase difference between these signals may begin to shift due to errors inherent to the components of the rectifier 120 (e.g., inexact inductance values for L1 and/or L2). As described above and below, example embodiments aim to keep the phase difference between control signals CON1 and CON2 as close to 180 degrees as possible.

Operation 508 includes detecting that the first current I1 falls to a first minimum value (e.g., zero or near zero) at a first time t4. The first current I1 flowing through the inductor L1 may be detected by one or more current sensors included in sensors 124.

Operation 512 includes detecting that the second current I2 falls to a second minimum value (e.g., zero or near zero) at a second time t6. The second current I2 flowing through the inductor L2 may be detected by one or more current sensors included in sensors 124. The first minimum value and the second minimum value may have a same or different value. In addition, the first and/or second minimum values may a design parameter set based on empirical evidence and/or preference. In at least one example embodiment, the first and/or second minimum values are adjusted during operation of the rectifier 120 to account for errors inherent to the components of the rectifier 120. For example, prior operation statistics of the rectifier 120 may indicate that the first and second currents I1 and I2 have minimums that change over time (e.g., as the components of the rectifier 120 heat up). Thus, the first and second minimum values may be adjusted up or down during operation of the rectifier 120 to further improve the system.

Operation 516 includes determining a first difference d1 between the first time t4 and the second time t6. For example, the first difference d1 corresponds to the time at time t4 subtracted from the time at time t6.

Operation 520 includes determining whether to adjust the second control signal CON2 based on the first difference d1 to bring the phase difference closer to a target phase difference (e.g., 180 degrees). The conditions for adjustment or non-adjustment of the second control signal CON2 are described in more detail below with reference to FIG. 6.

Operation 524 includes controlling the first control signal CON1 to rise (e.g., at time t4) in response to detecting the that the first current I1 is at the first minimum value.

Operation 530 includes controlling the second control signal CON2 to rise (e.g., at time t6) in response to detecting that the second current I2 is at the second minimum value.

Figure 6:
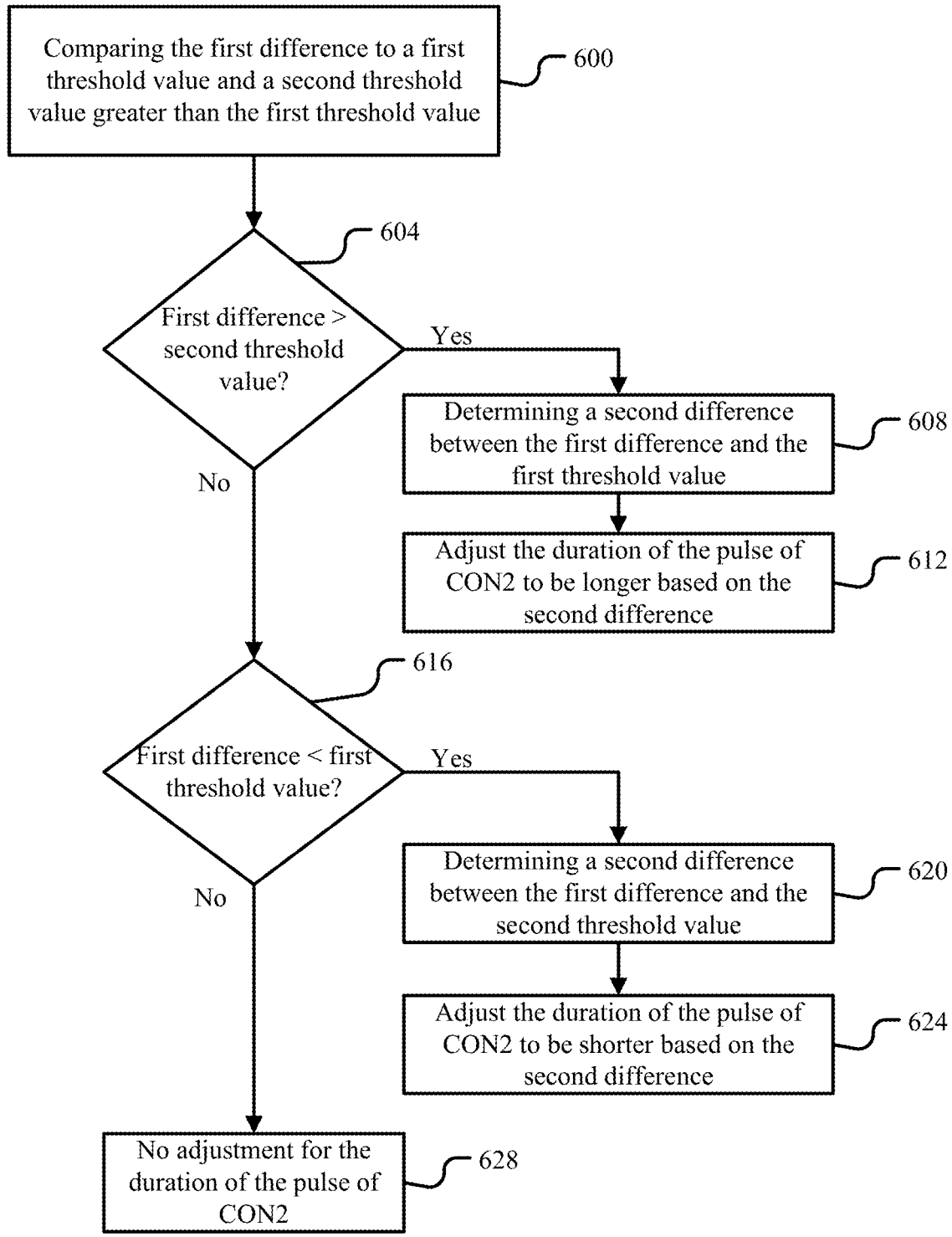
FIG. 6 illustrates a method according to at least one example embodiment.

FIG. 6 illustrates a method according to at least one example embodiment. The method in FIG. 6 may be carried out by elements of the system 100, for example, by the processor 116. FIG. 6 will be discussed in more detail below with reference to FIGS. 1-5. The order of the operations in FIG. 6 is not limited the order illustrated and may change according to design preferences. The operations in FIG. 6 describe operation 520 from FIG. 5 in more detail.

Operation 600 includes comparing the first difference d1 to a first threshold value th1 and a second threshold value th2 greater than the first threshold value th1 (e.g., threshold value th2 is further in time from a rising edge of control signal CON1 than the threshold value th1).

Operation 604 includes determining whether the first difference d1 is greater than the second threshold value th2. For example, operation 604 determines whether the first difference d1 is a longer time period than the time period indicated by the second threshold value th2. If so, the method proceeds to operation 608 to adjust a duration of a pulse of the second control signal CON2 to be longer. If not, the method proceeds to operation 616.

Operation 608 includes determining a second difference between the first difference d1 and the second threshold value th2. Similar to the first difference d1, the second difference may be indicative of a time difference between the time indicated by the first difference d1 and the time indicated by the second threshold value th2.

Operation 612 includes adjusting the duration of the pulse of the second control signal CON2 to be longer based on the second difference. For example, the method determines an amount of the adjustment for the duration of the pulse of the second control signal CON2 based on the second difference. In at least one example embodiment and as discussed above with reference to the previous FIGS., the amount of the adjustment may be proportional to the second difference.

Operation 616 includes determining whether the first difference d1 is less than the first threshold value th1. If so, the method proceeds to operation 620 to adjust a duration of a pulse of the second control signal CON2 to be shorter. If not, the method proceeds to operation 628.

Operation 620 includes determining a second difference between the first difference d1 and the first threshold value th1. Similar to the first difference d1, the second difference may be indicative of a time difference between the time indicated by the first difference d1 and the time indicated by the first threshold value th1.

Operation 624 includes adjusting the duration of the pulse of the second control signal CON2 to be shorter based on the second difference. For example, the method determines an amount of the adjustment for the duration of the pulse of the second control signal CON2 based on the second difference. In at least one example embodiment and as discussed above with reference to the previous FIGS., the amount of the adjustment may be proportional to the second difference.

If, in operation 616, the first difference d1 is not less than the first threshold value th1, then the method proceeds to operation 628. Operation 628 includes not adjusting the duration of the pulse of the second control signal CON2. Instead, the duration of the pulse(s) of the second control signal CON2 are maintained from an earlier point in time. Here, it should be appreciated that when the method reaches operation 628, this means that the phase difference between the first control signal CON1 and the second control signal CON2 is at or near the target phase difference of, for example, 180 degrees. In other words, the method determines to not adjust the duration of the pulse of the second control signal CON2 when the first difference d1 is greater than or equal to first threshold value the1 and less than or equal to the second threshold value th2 because the control signals CON1 and CON2 are at or close enough to the target phase difference.

Figure 7:
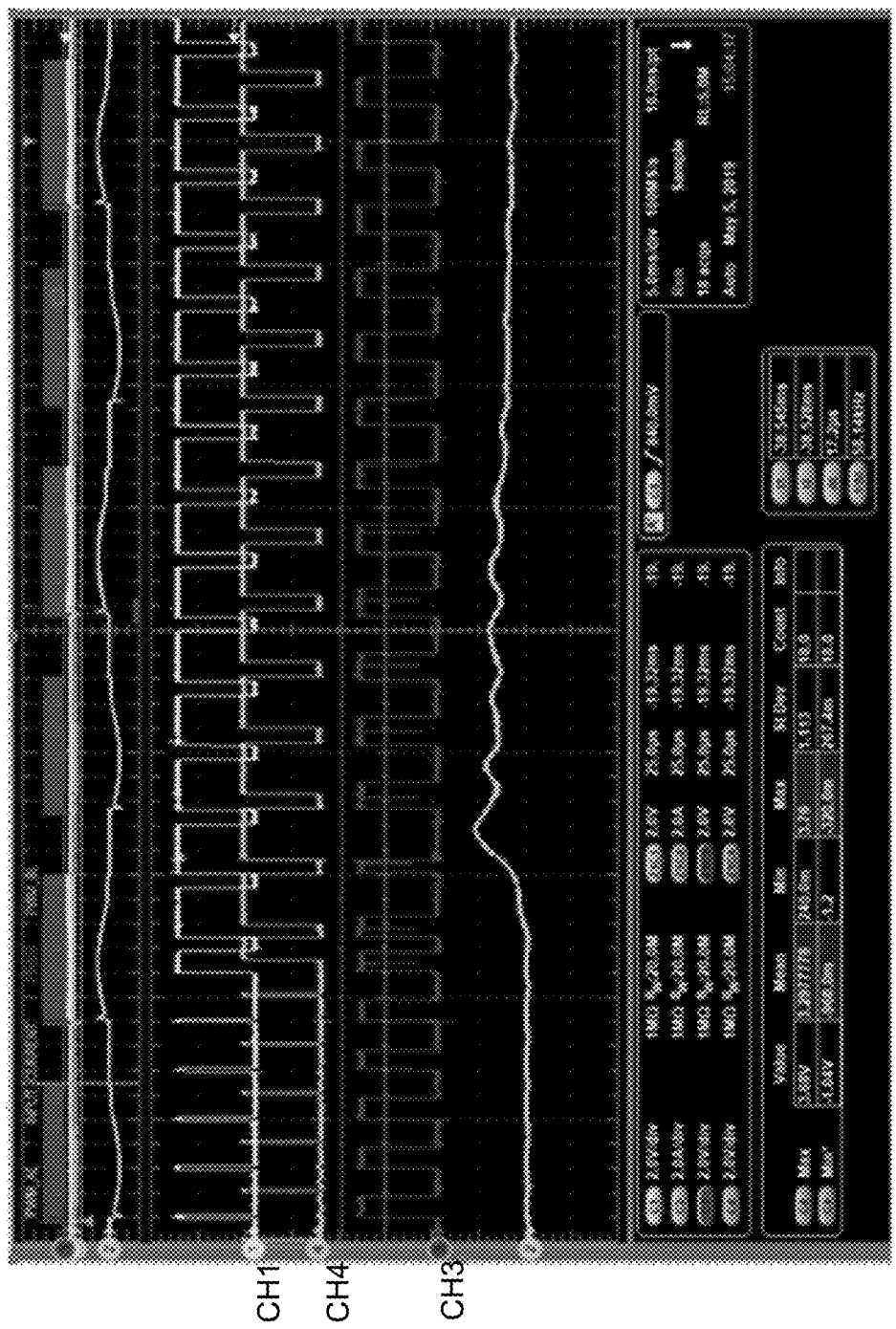
FIG. 7 illustrates a simulation for a rectifier being driven according to the timing diagram of FIG. 3 according to at least one example embodiment.

FIG. 7 illustrates a simulation for the rectifier 120 being driven according to the timing diagram in FIG. 3 according to at least one example embodiment. As illustrated on the left side of FIG. 7, the control signals CON1 and CON2 are initially not interleaved or at the target phase difference. However, as time progresses, the desired interleave is achieved and the control signals CON1 and CON2 have the target phase difference. The reference signal REF in FIG. 7 dips to indicate when the current I2 reaches a minimum. As time progresses, the dip in the reference signal REF moves toward the falling edge of the signal. When the dip reaches the falling edge of the reference signal REF, then the control signals CON1 and CON2 are considered to have achieved the target phase difference (e.g., 180 degrees).

In view of foregoing description, it should be appreciated that example embodiments provide methods and devices for ensuring that a rectifier will not enter CCM, thereby improving reliability of the rectifier.

At least one example embodiment is directed to a method for controlling a rectifier. The method includes applying a first control signal to a first switch of the rectifier to cause a first current to flow through a first inductor of the rectifier, applying a second control signal to a second switch of the rectifier to cause a second current to flow through a second inductor. The second control signal and the first control signal have a phase difference. The method includes detecting that the first current falls to a first minimum value at a first time, detecting that the second current falls to a second minimum value at a second time, determining a first difference between the first time and the second time, and determining whether to adjust the second control signal based on the first difference to bring the phase difference closer to a target phase difference.

According to at least one example embodiment, the method includes controlling the first control signal to rise in response to detecting the that the first current is at the first minimum value, and controlling the second control signal to rise in response to detecting that the second current is at the second minimum value.

According to at least one example embodiment, determining whether to adjust the second control signal includes comparing the first difference to a first threshold value and a second threshold value greater than the first threshold value.

According to at least one example embodiment, the method includes adjusting a duration of a pulse of the second control signal to be longer when the first difference is greater than the second threshold value.

According to at least one example embodiment, the method includes adjusting the duration of the pulse the second control signal to be shorter when the first difference is less than the first threshold value.

According to at least one example embodiment, the method includes determining a second difference between the first difference and either the first threshold value or the second threshold value, and determining an amount of the adjustment for the duration of the pulse of the second control signal based on the second difference.

According to at least one example embodiment, the amount of the adjustment for the duration of the pulse of the second control signal is proportional to the second difference.

According to at least one example embodiment, the method includes determining to not adjust the duration of the pulse of the second control signal when the first difference is greater than or equal to the first threshold value and less than or equal to the second threshold value.

According to at least one example embodiment, the first threshold value and the second threshold value are based on a midpoint of a period of the first control signal.

According to at least one example embodiment, the first threshold value and the second threshold value are equidistant in time to the midpoint of the period of the first control signal.

At least one example embodiment is directed to a device for controlling a rectifier, the device comprising a memory including instructions and a processor. The processor executes the instructions to apply a first control signal to a first switch of the rectifier to cause a first current to flow through a first inductor of the rectifier, apply a second control signal to a second switch of the rectifier to cause a second current to flow through a second inductor of the rectifier. The second control signal and the first control signal have a phase difference. The processor executes the instructions to detect that the first current falls to a first minimum value at a first time, detect that the second current falls to a second minimum value at a second time, determine a first difference between the first time and the second time, and determine whether to adjust the second control signal based on the first difference to bring the phase difference closer to a target phase difference.

According to at least one example embodiment, the processor executes the instructions to control the first control signal to rise in response to detecting the that the first current is at the first minimum value, and control the second control signal to rise in response to detecting that the second current is at the second minimum value.

According to at least one example embodiment, the processor determines whether to adjust the second control signal includes comparing the first difference to a first threshold value and a second threshold value greater than the first threshold value.

According to at least one example embodiment, the processor executes the instructions to adjust a duration of a pulse of the second control signal to be longer when the first difference is greater than the second threshold value.

According to at least one example embodiment, the processor executes the instructions to adjust the duration of the pulse the second control signal to be shorter when the first difference is less than the first threshold value.

According to at least one example embodiment, the processor executes the instructions to determine a second difference between the first difference and either the first threshold value or the second threshold value, and determine an amount of the adjustment for the duration of the pulse of the second control signal based on the second difference.

According to at least one example embodiment, the amount of the adjustment for the duration of the pulse of the second control is proportional to the second difference.

According to at least one example embodiment, the processor executes the instructions to determine to not adjust the duration of the pulse of the second control signal when the first difference is greater than or equal to the first threshold value and less than or equal to the second threshold value.

At least one example embodiment is directed to a system comprising a plurality of switches configured in a rectifier topology and including a first switch and a second switch and a controller. The controller is configured to apply a first control signal to the first switch of the rectifier to cause a first current to flow through a first inductor of the rectifier, apply a second control signal to the second switch of the rectifier to cause a second current to flow through a second inductor of the rectifier, the second control signal and the first control signal having a phase difference, detect that the first current falls to a first minimum value at a first time, detect that the second current falls to a second minimum value at a second time, determine a first difference between the first time and the second time, and determine whether to adjust the second control signal based on the first difference to bring the phase difference closer to a target phase difference.

According to at least one example embodiment, the rectifier topology is a totem-pole bridgeless power factor correction topology.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "determine," "calculate," "compute," and variations thereof, as used herein, are used interchangeably, and include any type of methodology, process, mathematical operation or technique.

What is claimed is:

1. A method for controlling a rectifier, the method comprising:
    applying a first control signal to a first switch of the rectifier to cause a first current to flow through a first inductor of the rectifier;
    applying a second control signal to a second switch of the rectifier to cause a second current to flow through a second inductor of the rectifier, the second control signal and the first control signal having a phase difference;
    detecting that the first current falls to a first minimum value at a first time;
    detecting that the second current falls to a second minimum value at a second time;
    determining a first difference between the first time and the second time; and
    determining whether to adjust the second control signal based on the first difference to bring the phase difference closer to a target phase difference.

2. The method of claim 1, further comprising:
    controlling the first control signal to rise in response to detecting that the first current is at the first minimum value; and controlling the second control signal to rise in response to detecting that the second current is at the second minimum value.

3. The method of claim 1, wherein determining whether to adjust the second control signal includes comparing the first difference to a first threshold value and a second threshold value greater than the first threshold value.

4. The method of claim 3, further comprising:
adjusting a duration of a pulse of the second control signal to be longer when the first difference is greater than the second threshold value.

5. The method of claim 4, further comprising:
adjusting the duration of the pulse the second control signal to be shorter when the first difference is less than the first threshold value.

6. The method of claim 5, further comprising:
determining a second difference between the first difference and either the first threshold value or the second threshold value; and
determining an amount of the adjustment for the duration of the pulse of the second control signal based on the second difference.

7. The method of claim 6, wherein the amount of the adjustment for the duration of the pulse of the second control signal is proportional to the second difference.

8. The method of claim 4, further comprising:
determining to not adjust the duration of the pulse of the second control signal when the first difference is greater than or equal to the first threshold value and less than or equal to the second threshold value.

9. The method of claim 3, wherein the first threshold value and the second threshold value are based on a midpoint of a period of the first control signal.

10. The method of claim 9, wherein the first threshold value and the second threshold value are equidistant in time to the midpoint of the period of the first control signal.

11. A device for controlling a rectifier, the device comprising:
a memory including instructions; and
a processor that executes the instructions to:
apply a first control signal to a first switch of the rectifier to cause a first current to flow through a first inductor of the rectifier;
apply a second control signal to a second switch of the rectifier to cause a second current to flow through a second inductor of the rectifier, the second control signal and the first control signal having a phase difference;
detect that the first current falls to a first minimum value at a first time;
detect that the second current falls to a second minimum value at a second time;
determine a first difference between the first time and the second time; and
determine whether to adjust the second control signal based on the first difference to bring the phase difference closer to a target phase difference.

12. The device of claim 11, wherein the processor executes the instructions to:
control the first control signal to rise in response to detecting that the first current is at the first minimum value; and
control the second control signal to rise in response to detecting that the second current is at the second minimum value.

13. The device of claim 11, wherein the processor determines whether to adjust the second control signal includes comparing the first difference to a first threshold value and a second threshold value greater than the first threshold value.

14. The device of claim 13, wherein the processor executes the instructions to:
adjust a duration of a pulse of the second control signal to be longer when the first difference is greater than the second threshold value.

15. The device of claim 14, wherein the processor executes the instructions to:
adjust the duration of the pulse the second control signal to be shorter when the first difference is less than the first threshold value.

16. The device of claim 15, wherein the processor executes the instructions to:
determine a second difference between the first difference and either the first threshold value or the second threshold value; and
determine an amount of the adjustment for the duration of the pulse of the second control signal based on the second difference.

17. The device of claim 16, wherein the amount of the adjustment for the duration of the pulse of the second control signal is proportional to the second difference.

18. The device of claim 15, wherein the processor executes the instructions to:
determine to not adjust the duration of the pulse of the second control signal when the first difference is greater than or equal to the first threshold value and less than or equal to the second threshold value.

19. A system comprising:
a plurality of switches configured in a rectifier topology and including a first switch and a second switch; and
a controller configured to:
apply a first control signal to the first switch of the rectifier topology to cause a first current to flow through a first inductor of the rectifier topology;
apply a second control signal to the second switch of the rectifier topology to cause a second current to flow through a second inductor of the rectifier topology, the second control signal and the first control signal having a phase difference;
detect that the first current falls to a first minimum value at a first time;
detect that the second current falls to a second minimum value at a second time;
determine a first difference between the first time and the second time; and
determine whether to adjust the second control signal based on the first difference to bring the phase difference closer to a target phase difference.

20. The system of claim 19, wherein the rectifier topology is a totem-pole bridgeless power factor correction topology.

\* \* \* \* \*